(12) United States Patent
Yoon

(10) Patent No.: US 8,904,415 B2
(45) Date of Patent: Dec. 2, 2014

(54) METHOD AND SYSTEM FOR PROVIDING WIRELESS LAN SERVICE USING RENTAL DIGITAL TELEVISION

(76) Inventor: Joo-woong Yoon, Goyang-si (KR)

( * ) Notice: Subject to any disclaimer, the term of this patent is extended or adjusted under 35 U.S.C. 154(b) by 164 days.

(21) Appl. No.: 13/507,226

(22) Filed: Jun. 14, 2012

(65) Prior Publication Data

US 2012/0260274 A1 Oct. 11, 2012

(51) Int. Cl.
*H04N 7/16* (2011.01)
*H04W 12/06* (2009.01)
*H04N 21/643* (2011.01)
*H04N 21/472* (2011.01)
*H04N 21/436* (2011.01)
*H04N 21/2543* (2011.01)
*H04N 21/414* (2011.01)
*H04N 7/173* (2011.01)
*H04W 4/00* (2009.01)
*H04W 84/12* (2009.01)

(52) U.S. Cl.
CPC ................ *H04W 12/06* (2013.01); *H04W 4/00* (2013.01); *H04N 21/64315* (2013.01); *H04N 21/47202* (2013.01); *H04N 21/43615* (2013.01); *H04N 21/2543* (2013.01); *H04W 84/12* (2013.01); *H04N 21/64322* (2013.01); *H04N 21/41407* (2013.01); *H04N 7/17318* (2013.01)

USPC ............................................................. 725/5

(58) Field of Classification Search
CPC ..................... H04N 21/2547; H04N 21/25475
USPC ........................................................ 725/1–8
See application file for complete search history.

(56) References Cited

U.S. PATENT DOCUMENTS

| 2008/0178236 A1* | 7/2008 | Hoshall .......................... 725/109 |
| 2010/0138882 A1* | 6/2010 | Ellis et al. ......................... 725/93 |
| 2012/0066703 A1* | 3/2012 | Scott et al. ......................... 725/8 |

* cited by examiner

*Primary Examiner* — Junior Mendoza

(57) ABSTRACT

A method and system for providing a wireless LAN service using a rental digital television is provided. When a wireless-LAN-embedded digital television leased to a first user is turned on, the digital television accesses a management authentication server using a service server included in the digital television to determine whether or not the first user is a lease service subscriber. A TV tuner of the digital television is activated if the first user is a lease service subscriber. When a terminal of a second user has accessed an access point of the digital television, the digital television accesses the management authentication server using the service server to determine whether or not the second user is a wireless LAN service subscriber. A wireless LAN service is provided to the terminal of the second user if the second user is a wireless LAN service subscriber.

6 Claims, 9 Drawing Sheets

METHOD AND SYSTEM FOR PROVIDING WIRELESS LAN SERVICE USING RENTAL DIGITAL TELEVISION

BACKGROUND OF THE INVENTION

1. Field of the Invention

The present invention relates to a wireless LAN, and more particularly to a method and system for providing a wireless LAN service using a rental digital television.

2. Description of the Related Art

Currently, television broadcasts are changing from analog to digital. Electronic products are also changing from analog to digital. Low-quality media devices are increasingly replaced with high-quality multimedia devices. Although the demand for digital televisions is on the rise in the course of such commercial, social, and cultural changes, it is difficult to spread digital televisions since they are very expensive compared to the demand.

Wireless LAN is a new technology which attracts a lot of attention recently. Due to the new Intel Centrino technology, wireless LAN cards are installed in many notebook computers and wireless LAN features are added to many portable devices. Despite of this fact, the wireless LAN is not widely used. One reason is that an access point used in this technology, which is a point of connection to a wired network, is available only in a limited area and has low mobility. Another reason is that the wireless LAN technology does not provide services differentiated from services provided through the wired network due to its low bandwidth compared to that of the wired network. Although many researchers strive to establish a new standard solving such problems and to improve the performance of the wireless LAN, the wireless LAN is still not widely used.

As described above, it is difficult to spread the digital television and wireless LAN due to the high price of the digital television and the limited available range of the access point and thus difficult to provide a variety of services using the digital television and wireless LAN.

SUMMARY OF THE INVENTION

Therefore, it is an object of the present invention to provide a method for providing a wireless LAN service using a rental digital television, which overcomes the above problems associated with the spread of the digital television and wireless LAN, whereby digital television customers can easily install both a digital television and an environment for use of a wireless LAN in their home or place of business to receive a variety of services, wireless LAN users can access and use environments in which it is easy to use the wireless LAN, and service providers can easily spread access points using the demand for digital televisions and thus can increase the number of wireless LAN service subscribers to provide a variety of services to them.

It is another object of the present invention to provide a system for providing a wireless LAN service using a rental digital television according to the above method.

In accordance with one aspect of the present invention, the above and other objects can be accomplished by the provision of a method for providing a wireless LAN service using a rental digital television, the method comprising accessing a management authentication server using a service server included in a wireless-LAN-embedded digital television leased to a first user when the wireless-LAN-embedded digital television is turned on and determining whether or not the first user is a lease service subscriber; activating a TV tuner of the wireless-LAN-embedded digital television if the first user is a lease service subscriber; accessing the management authentication server using the service server when a terminal of a second user has accessed an access point of the wireless-LAN-embedded digital television and determining whether or not the second user is a wireless LAN service subscriber; and providing a wireless LAN service to the terminal of the second user if the second user is a wireless LAN service subscriber.

In accordance with another aspect of the present invention, there is provided a system for providing a wireless LAN service using a rental digital television, the system comprising a management authentication server in which lease service subscriber information and wireless LAN service subscriber information is stored; a terminal of a second user including a modem for accessing an access point; and a wireless-LAN-embedded digital television leased to a first user, wherein, when the wireless-LAN-embedded digital television is powered on, a TV tuner included in the wireless-LAN-embedded digital television is activated if the first user is a lease service subscriber and, when the wireless-LAN-embedded digital television is connected to the terminal of the second user, the wireless-LAN-embedded digital television provides a wireless LAN service to the terminal of the second user if the second user is a wireless LAN service subscriber, wherein the wireless-LAN-embedded digital television includes the TV tuner for outputting a received broadcast signal to a display panel; an access point connected to a wired network, the access point being accessed by the terminal; and a service server, wherein, when the wireless-LAN-embedded digital television is turned on, the service server accesses the management authentication server to determine whether or not the first user is a lease service subscriber and, when the terminal has accessed the access point, the service server accesses the management authentication server to determine whether or not the second user is a wireless LAN service subscriber.

In the following description, a user who desires to lease a digital television is defined as a first user, a user who desires to use a wireless LAN service is defined as a second user, a user who desires to use an Internet phone service is defined as a third user, and a user who desires to purchase digital content through a wireless LAN is defined as a fourth user.

The invention provides a digital television combined with an'access point. In the invention, a server (i.e., a management authentication server) that performs authentication of connection to the wireless LAN through the hybrid digital television and that supports or performs a process for paying the connection fee is connected to the Internet. The digital television is designed to activate the access point when the digital television is powered on in order to induce lease service subscribers provided with the digital television to keep the access point active as long as possible. The digital television operates in combination with the management authentication server on the Internet to control basic wireless LAN connection operations.

Preferably, an incentive proportional to the number of accesses to the access point by wireless LAN service subscribers can be provided to wired network subscribers provided with digital televisions in order to improve the quality of services provided to the wireless LAN service subscribers. Preferably, digital televisions are identified with respective serial numbers to allow the management authentication server to obtain access statistics.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will now be described with reference to the accompanying drawings. The preferred embodiments can be modified to various other forms and the scope of the invention is not limited to the embodiments.

Figure 1:
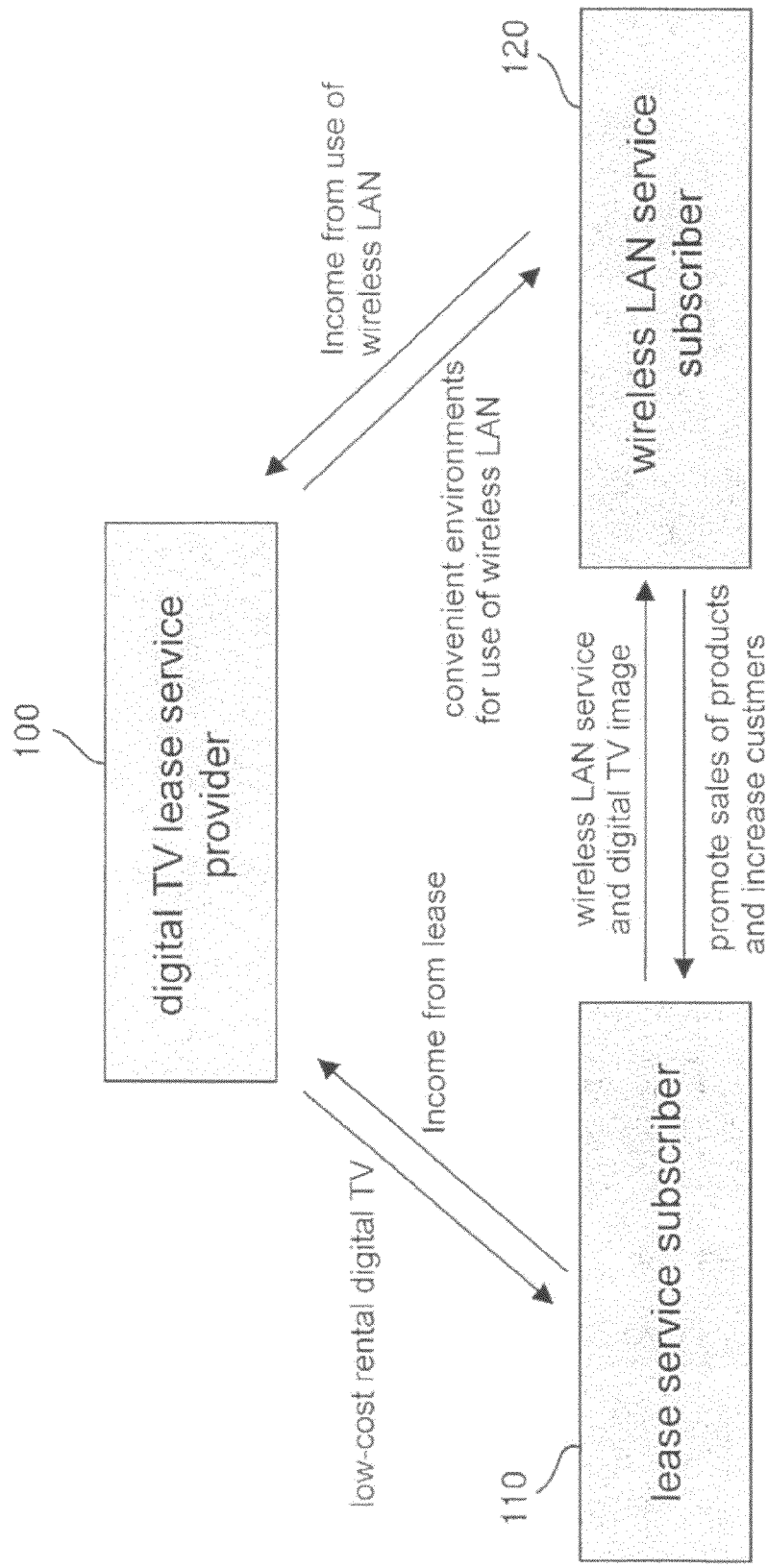
FIG. 1 illustrates a system for providing a wireless LAN service using a rental digital television according to an embodiment of the invention.

FIG. 1 illustrates a system for providing a wireless LAN service using a rental digital television according to an embodiment of the invention.

The invention uses a wireless-LAN-embedded digital television to meet a combination of a demand for a digital television and a demand for more convenient environments for use of a wireless LAN.

For efficient spread of the wireless LAN, the invention combines a digital television which is a video medium with an access point which is a basic element of the wireless LAN and provides the combined digital television to a wired network subscriber (specifically, a lease service subscriber 110) and provides a method which allows a wireless LAN service subscriber 120 to receive the right to use the wireless LAN from the wired network subscriber and then to access the Internet through the wireless LAN.

The following is a description of features of this business model from the viewpoint of each of a service provider (specifically, a digital television lease service provider 100), the lease service subscriber 110, and the wireless LAN service-subscriber 120.

First, the digital television lease service provider 100 leases a digital television for free or at low cost and provides a wireless LAN service, thereby making it possible to easily attract subscribers and also to create benefits from lease of digital televisions and sale of wireless LAN tickets (or access rights). In addition, it is possible to create benefits from use of the digital television, which is a high performance video medium, as an advertisement medium and also to create benefits from connection of various wireless devices to the Internet.

The lease service subscriber 110 can lease a digital television at low cost without directly purchasing the television and can also receive a wireless LAN service in near places.

The wireless LAN service subscriber 120 can use Internet services in a place where such a hybrid digital television is installed in the same manner as in a place where a conventional access point is installed and thus can use various services such as Internet services more conveniently.

Figure 2:
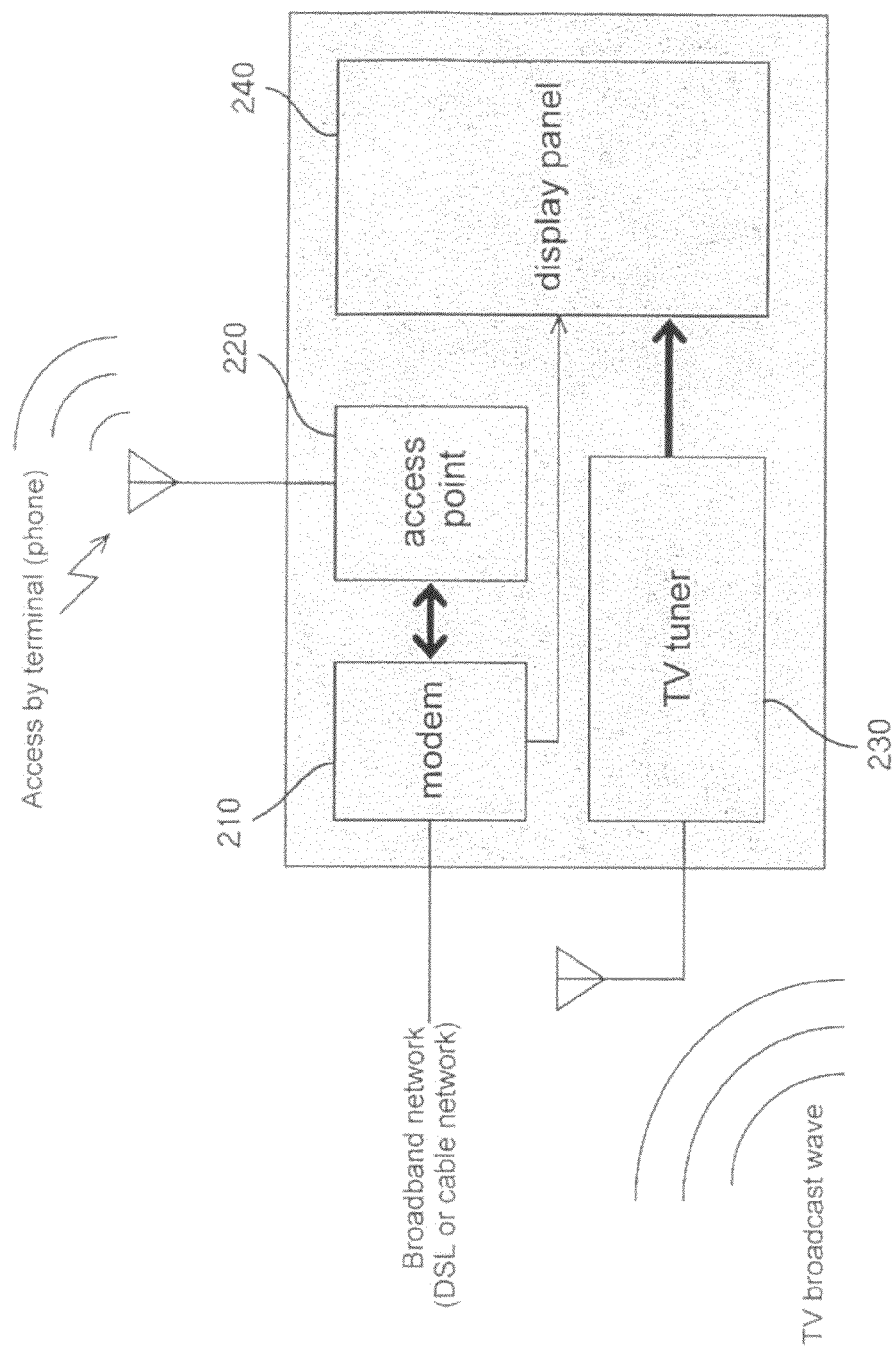
FIG. 2 is a block diagram of a wireless-LAN-embedded digital television used in the system of FIG. 1.

FIG. 2 is a block diagram of a wireless-LAN-embedded digital television used in the system of FIG. 1.

The wireless-LAN-embedded digital television includes a DSL or cable modem 210, an access point 220, a TV tuner 230, and a display panel 240. The DSL or cable modem 210 is connected to a broadband network and operates in combination with the access point 220.

The DSL or cable modem 210, which is connectable to a wired network, and the access point 220 may be integrated and manufactured as a single modem board. This modem board includes a wired modem portion which is the DSL or cable modem 210 and a wireless modem portion which is the access point 220. The modem board includes a service server and an access management tool which are able to manage accesses by wireless LAN users. Through the service server and the access management tool, the digital television operates in combination with a management authentication server of a service provider on the Internet to perform a payment operation and an access authentication operation.

When the wireless-LAN-embedded digital television is turned on, a service server included in the modem 210 such as a DSL modem or a cable modem or the access point 220 accesses the management authentication server to determine whether or not a first user is a lease service subscriber. In addition, when a terminal of a second user accesses the access point, the service server included in the modem 210 accesses the management authentication server to determine whether or not a second user is a wireless LAN service subscriber.

The user can watch the digital television only after the modem 210 is activated to access the Internet and authentication is performed by the management authentication server of the service provider.

The access point 220, which is accessed by the terminal, is connected to a wired network.

The terminal of the second user can use wireless LAN services only after it accesses the wireless LAN and authentication is then performed by the management authentication server. To help the management authentication server perform the authentication process, a service server is run in the access point 220 or the modem 210 such as a DSL or cable modem. When a terminal of a wireless LAN service user has been connected to the access point 220, the access point 220 may operate in combination with the management authentication server to terminate the connection of the terminal if a specific connection condition is not satisfied, for example based on a given time period or range or specific dates.

The TV tuner 230 outputs a received broadcast signal to the display panel 240. The received broadcast signal includes a general terrestrial signal, a satellite broadcast signal, a cable broadcast signal, etc.

Figure 3:
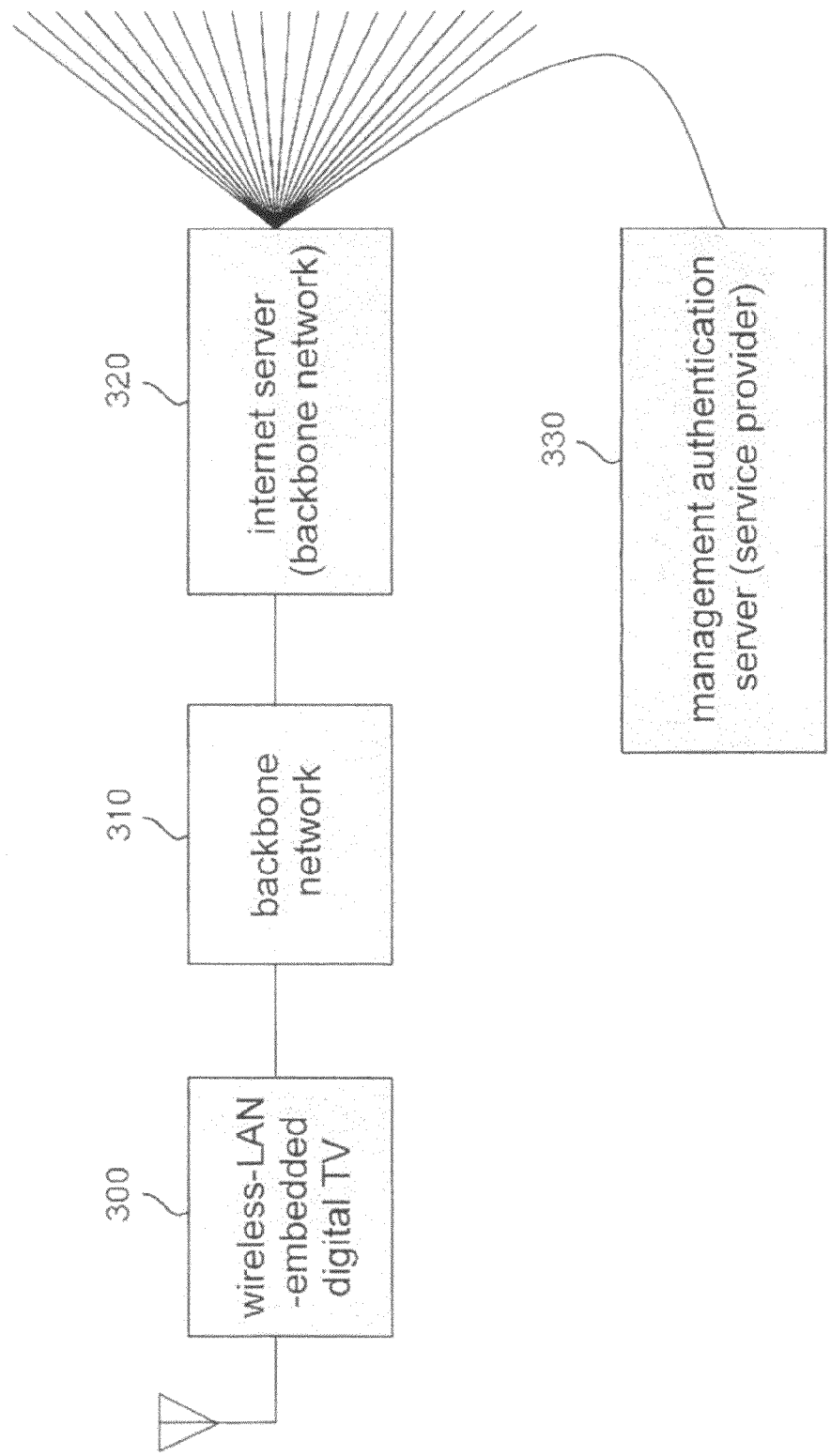
FIG. 3 illustrates a structure for connection of the wireless-LAN-embedded digital television used in the system of FIG. 1 to a backbone network.

FIG. 3 illustrates a structure for connection of the wireless-LAN-embedded digital television used in the system of FIG. 1 to a backbone network.

A wireless-LAN-embedded digital television 300 is leased to a first user who desires to use a digital television. When the digital television 300 is powered on, a TV tuner 230 included in the digital television 30 is activated if the first user is a lease service subscriber. When the digital television 300 is connected to a terminal of a second user, the digital television 300 provides a wireless LAN service to the terminal of the second user if the second user is a wireless LAN service subscriber.

The terminal of the second user includes a modem for connection to an access point.

The service provider installs a management authentication server 330 for service maintenance and management and operates the management authentication server 330 by connecting it to the Internet. The management authentication server 330 is connected to the wireless-LAN-embedded digital television 330 through the backbone network 310 and the Internet server 320 of the Internet service provider.

Preferably, when the first user makes a request to lease a digital television, the management authentication server 330 records information of the first user including a lease fee and registers the first user as a lease service subscriber. The management authentication server 330 may adjust the lease fee according to the number of times and how long terminals access the access point 220.

Basic functions of the management authentication server 330 include user management, payment, collection of access-related statistical information, and provision of information for convenience of users. The management authentication server 330 stores lease service subscriber information and wireless LAN service subscriber information.

Figure 4:
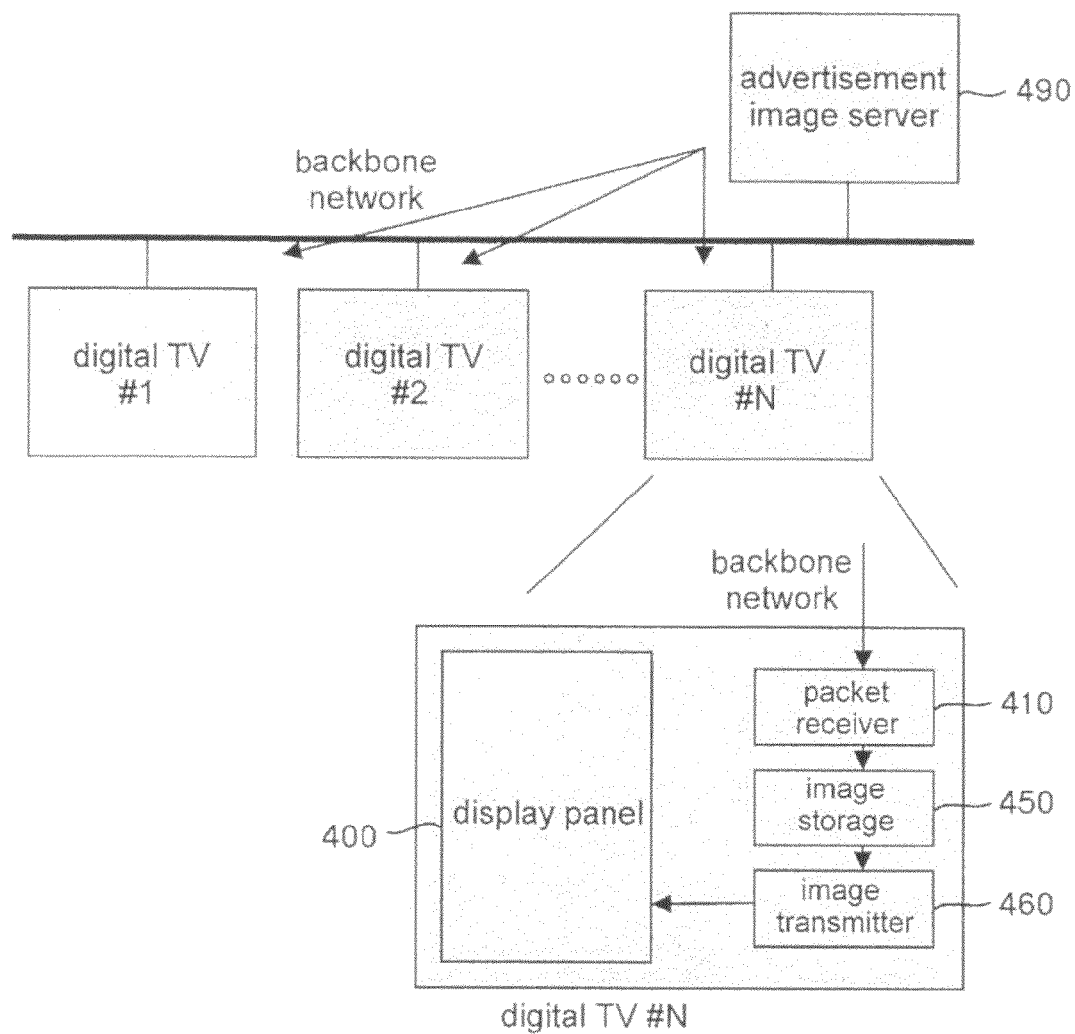
FIG. 4 illustrates a system for providing a wireless LAN service using a rental digital television according to another embodiment of the invention.

FIG. 4 illustrates a system for providing a wireless LAN service using a rental digital television according to another embodiment of the invention.

An advertisement image server 490 stores advertisement image information of a plurality of advertisers.

Each digital television includes a display panel 400, a packet receiver 410, an image storage 450, and an image transmitter 460.

The packet receiver 410 accesses the advertisement image server 490 and receives advertisement image information.

The image storage 450 stores the received advertisement image information. The image storage 450 includes at least one of a volatile memory element, a nonvolatile memory element, and a hard disk drive.

The image transmitter 460 outputs an image produced by decoding the stored advertisement image information to a screen of the digital television.

The modem 210 may include the packet receiver 410, the image storage 450, and the image transmitter 460.

Advertisement image information is transmitted from the advertisement image server 490 to the digital television through the Internet and is then recorded in a storage medium included in the modem. At a specific time or under a specific condition, the recorded information is forcibly transmitted to the display panel 400 to be output through it.

At any other time, the user can freely watch broadcasts on the digital television. The advertisement image information may be output instead of all or part of the TV image at a specific time or under a specific condition. The advertisement image information is automatically communicated between the packet receiver 410 and the advertisement image server 490. Thereafter, regardless of whether it is connected to the network, the modem automatically broadcasts the advertisement image information through the display panel 400, irrespective of any manipulation done by the lease service subscriber. Although advertisement image information carrying the same advertisement may be collectively transmitted and broadcast to digital televisions, a specific advertisement may be individually transmitted and broadcast to a specific digital television as needed, thereby providing targeted advertisement. To accomplish this, the server has a list of serial numbers of digital televisions and transmits desired advertisement image information to a digital television identified with its serial number.

The system of FIG. 4 may also be used to provide various services, examples of which include operation of a digital content shopping mall and a Voice over Internet Protocol (VoIP) phone using a wireless LAN.

In the case where the system is applied to the VoIP phone service, a VoIP phone that can access a wireless LAN can access the management authentication server 330 and the management authentication server 330 can perform call management, specifically, management of call durations, call rates or fees, and the like of the phone.

The phone of the third user is incorporated into VoIP software.

When the phone accesses the access point 220, a service server 210 accesses the management authentication server 330 to determine whether or not the third user is an Internet phone service subscriber.

If the third user is an Internet phone service subscriber, the access point 220 provides an Internet phone service to the phone of the third user.

In the case where the system is applied to the shopping mall service, the management authentication server 330 operates to provide shopping mall functions in addition to the above-mentioned advertisement functions, so that it can sell digital content (for example, MP3, movie, and e-book content) through the Internet.

If a fourth user inputs purchase information to purchase digital content represented by a displayed image to a terminal of the fourth user, then the terminal accesses the access point 220.

If the terminal of the fourth user accesses the access point 220, then the management authentication server 330 requests confirmation of the purchase information from the terminal of the fourth terminal. When the fourth user has confirmed the purchase information, the management authentication server 330 transmits digital content according to the purchase information to the terminal of the fourth user. The system may be designed to use an external server other than the management authentication server 330 to request confirmation of the purchase information and to transmit digital content according to the purchase information to the terminal.

Figure 5:
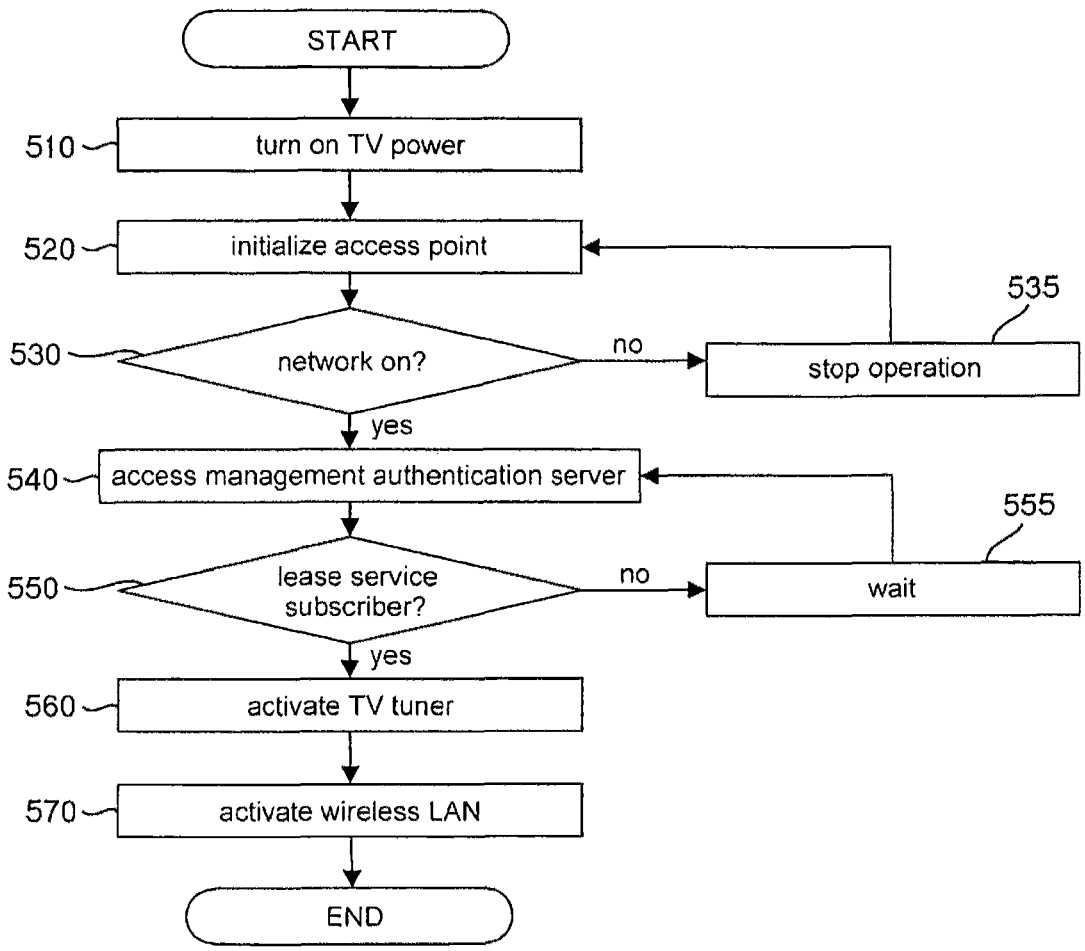
FIG. 5 is a flow chart of a method for providing a wireless LAN service using a rental digital television according to another embodiment of the invention.

FIG. 5 is a flow chart of a method for providing a wireless LAN service using a rental digital television according to another embodiment of the invention.

First, power is supplied to a wireless-LAN-embedded digital television leased to a first user or the power of the digital television is turned on by operating a power button (510).

When the digital television is turned on, an access point is initialized (520).

The access point initialization establishes a connection to the wired network. Then, if the network is ready (530), a service server included in the wireless-LAN-embedded digital television is used to access the management authentication server (540). If the network is not ready (530), the operation of the digital television is stopped and the access point is reinitialized (520).

When the digital television has been connected to the management authentication server, it is determined whether or not the first user is a lease service subscriber (550). Preferably, this step (550) includes the step of recording information of the first user including a lease fee and registering the first user as a lease service subscriber at the management authentication server when the first user has made a digital television lease request.

If the first user is not a lease service subscriber, the digital television again accesses the management authentication server (540) after waiting for a predetermined time (555).

If the first user is a lease service subscriber, a TV tuner of the wireless-LAN-embedded digital television is activated (560).

Finally, the access point of the wireless-LAN-embedded digital television is used to provide a wireless LAN service to a terminal of a second user (570).

Preferably, this step (570) includes the step of adjusting the lease fee according to the number of times and how long terminals access the access point at the management authentication server.

Each digital television has a fixed product number. When power is supplied to the digital television, its modem board accesses a management authentication server of a service provider through the Internet. After performing authentication, the management authentication server transmits a message, which contains information indicating whether or not the authentication is successful, to the digital television. The digital television gets a control right according to the message.

Figure 6:
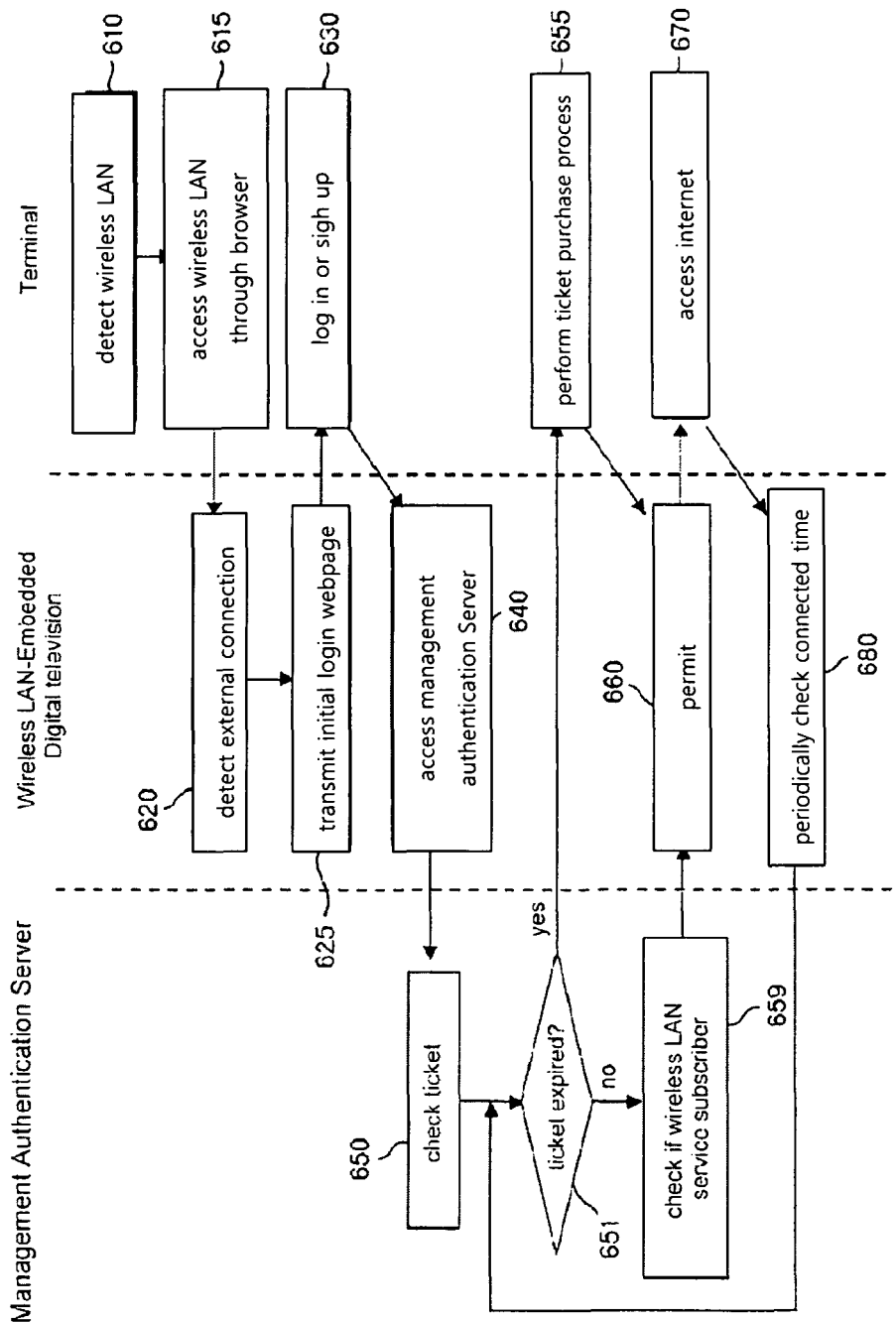
FIG. 6 is a detailed flow chart of a wireless LAN activation step in FIG. 5.

FIG. 6 is a detailed flow chart of the wireless LAN activation step (570) of FIG. 5.

A process for authenticating a wireless LAN service subscriber is explained in the description of FIG. 6. First, a terminal of a second user detects a wireless LAN (specifically, a wireless LAN access point) that can be accessed by the terminal (610).

Then, the terminal accesses the detected access point using a web browser of the terminal (615). After detecting the access by the terminal of the second user (620), the wireless LAN access point transmits an authentication webpage to the terminal so that the authentication webpage is displayed on the web browser of the terminal (625).

The second user logs in through the web browser (630). If it is determined through the login process that the terminal of the second user has a ticket (or access right), the wireless LAN access point permits the access of the terminal to the Internet (or public network) through the wireless LAN after performing authentication processes (640-659). If the terminal of the second user has no ticket (or access right), the second user signs up (630) and purchases a ticket (or access right) through payment (655).

Thereafter, the terminal can again access the access point to use the Internet in the same method as described above. An available time period or range or available dates are defined in the ticket. If the ticket is used for longer than a specific time, the wireless LAN access point determines whether or not to terminate the connection of the terminal while periodically checking how long the terminal has been connected to the Internet (680).

Figure 7:
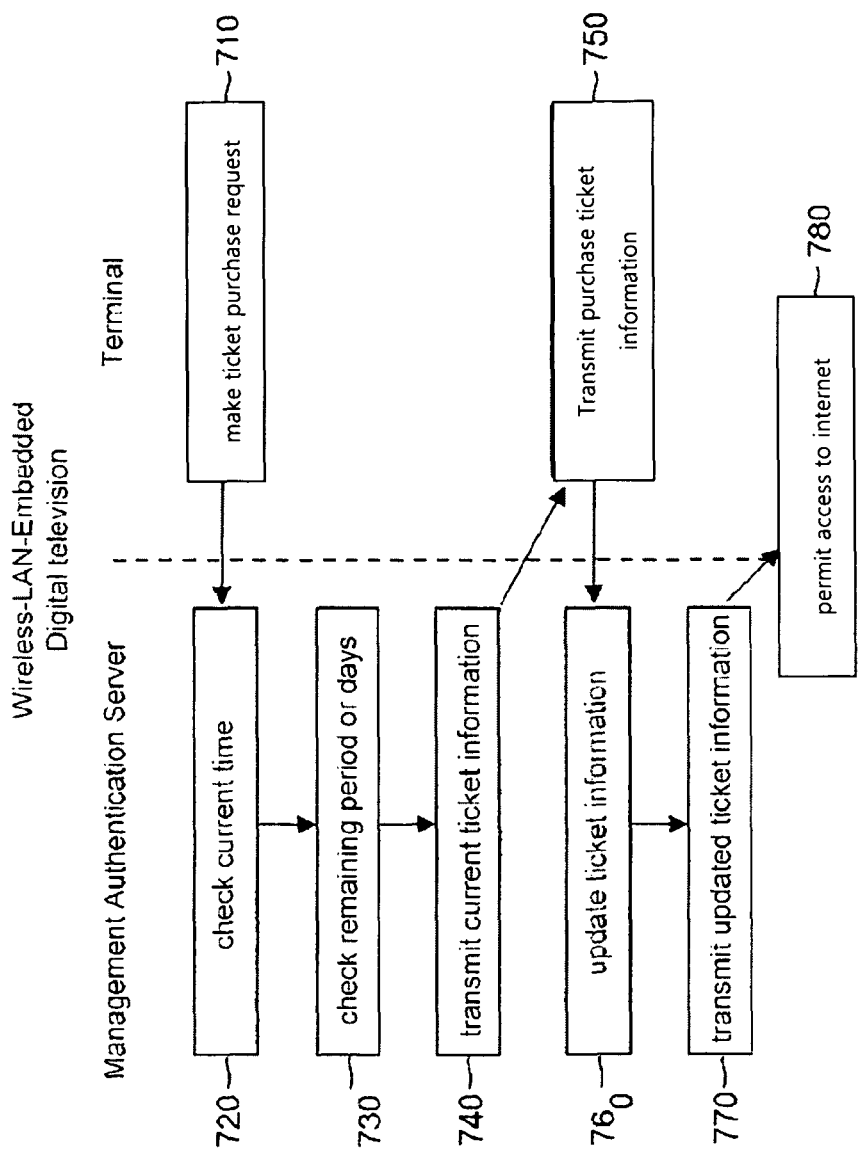
FIG. 7 is a detailed flow chart of a ticket purchase step in FIG. 6.

FIG. 7 is a detailed flow chart of the ticket purchase step (655) of FIG. 6.

The flow chart of FIG. 7 illustrates a payment process for obtaining a ticket (or access right) in the wireless LAN access process. First, a wireless LAN user receives information from the management authentication server through the access point (i.e., the wireless-LAN-embedded digital television). When the user determines, based on the received information, that a ticket (access right) of the user is expired or its remaining period (or time) is shorter than required, the user makes a payment attempt request in order to access the Internet (710). Here, the management authentication server informs the user of the remaining period of the ticket (access right) (720-740) and awaits payment by the user. The user inputs and transmits payment information to the server (750) to extend the period of the ticket of the user (760). When this process is completed, the management authentication server updates information of the ticket of the current user of the access point which is an intermediate medium (770) and the access point permits access of the terminal to the Internet according to the updated information (780).

Figure 8:
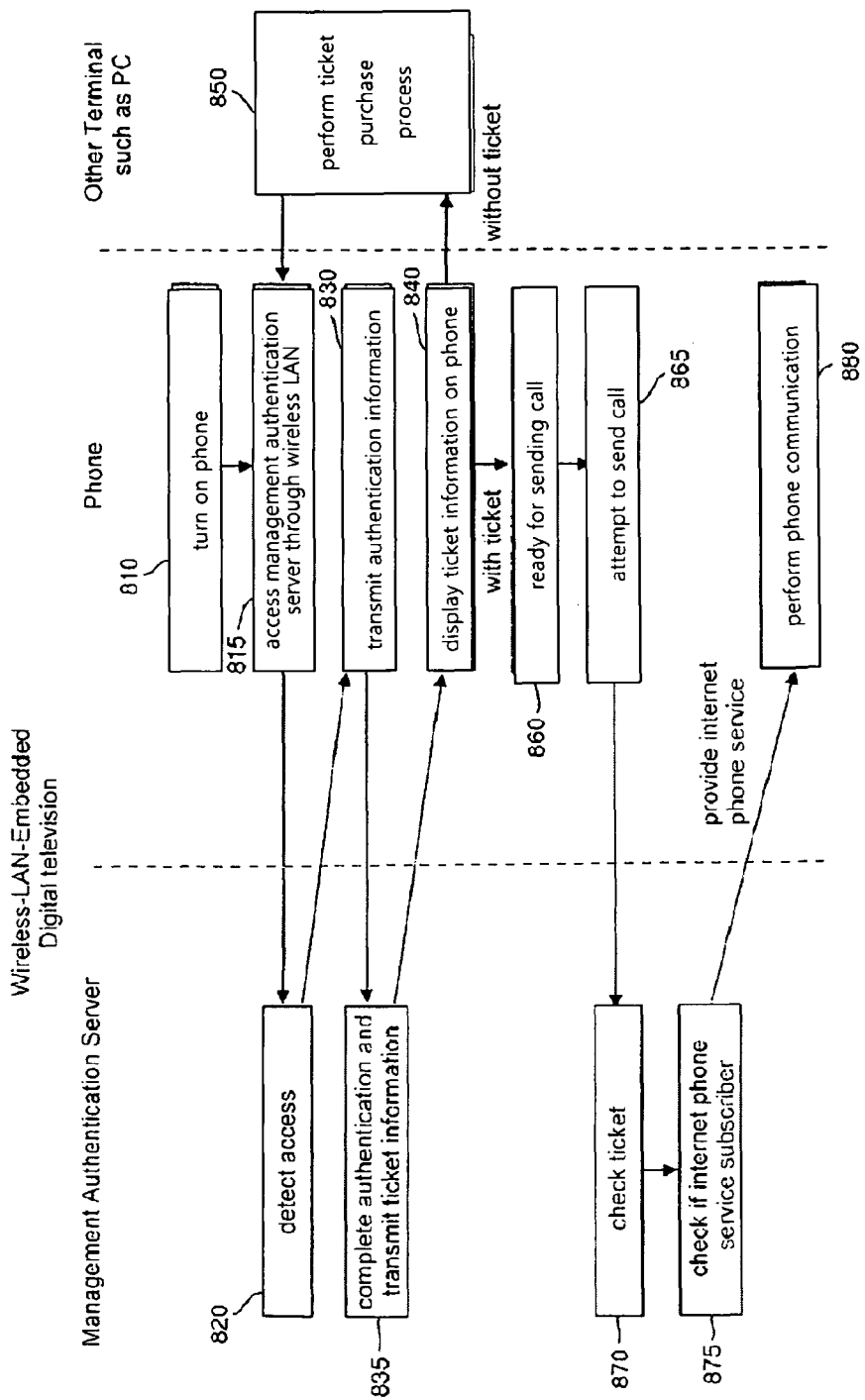
FIG. 8 is a flow chart of a method for providing a wireless LAN service using a rental digital television according to another embodiment of the invention.

FIG. 8 is a flow chart of a method for providing a wireless LAN service using a rental digital television according to another embodiment of the invention.

The flow chart of FIG. 8 illustrates how a phone connection service is provided through VoIP. A VoIP phone capable of accessing a wireless LAN (or wireless LAN module) is leased to a place such as a restaurant or a coffee shop to which a wireless-LAN-embedded digital television has been leased. Then, it is possible to provide an inexpensive voice communication service through a wireless LAN module of the digital television.

If a third user turns on the phone or picks up its receiver (810), the phone accesses the management authentication server through the wireless LAN to which the phone has been connected (815). Here, if the phone of the third user accesses the access point, it accesses the management authentication server using a service server included in the wireless-LAN-embedded digital television (815).

The management authentication server checks a ticket of the third user to determine whether or not the third user is an Internet phone service subscriber (820-875).

Here, the phone transmits authentication information required to check the ticket to the management authentication server (830). When the management authentication server completes authentication of the ticket (835), the phone displays the authenticated ticket information and is then ready for sending a call (840 and 860).

When the third user attempts to send a call by pressing a button on the phone (865), the management authentication server checks the authenticated ticket (870) and determines whether or not the third user is an Internet phone service subscriber (875).

If the third user is an Internet phone service subscriber, the management authentication server provides an Internet phone service to the phone of the third user (880).

The following are some technical features required to accomplish such a service.

The VoIP phone is basically able to access the wireless LAN. The VoIP phone is activated after being connected to and authenticated by a management authentication server that is installed on the Internet to operate digital televisions.

The management authentication server has a list of VoIP phones and stores information regarding the respective rights to use the VoIP phones. A billing process involves a ticket purchase process (850) in which the user purchases a ticket (or use right) through the management authentication server using another terminal such as a PC connected to the wireless LAN in a similar manner to the payment process. As needed, the VoIP phone may be connected to a public telephone network to make it possible to make a phone call using the VoIP phone. For spread of such a service, an incentive such as discount of the lease fee may be provided to the lease service subscriber of the digital television according to the amount of calls made using the phone.

Figure 9:
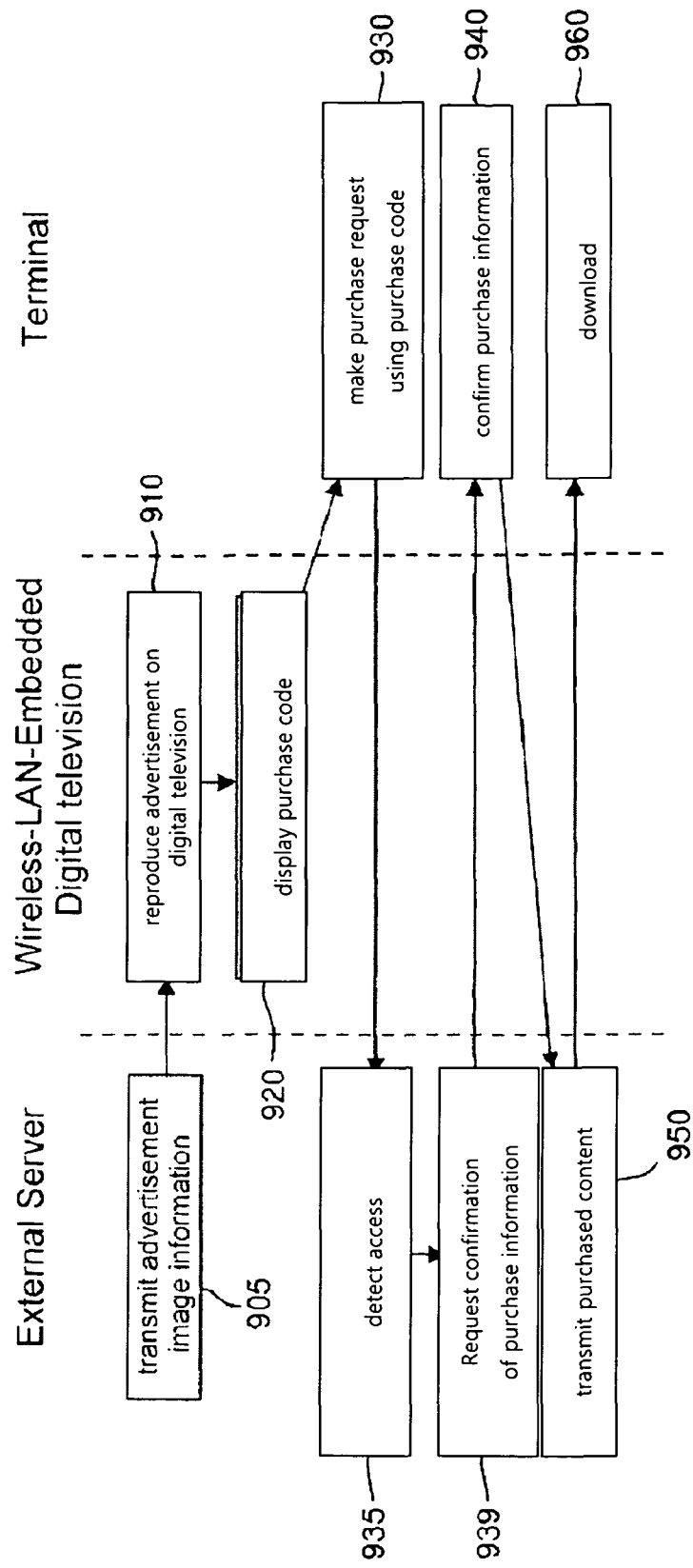
FIG. 9 is a flow chart of a method for providing a wireless LAN service using a rental digital television according to another embodiment of the invention.

FIG. 9 is a flow chart of a method for providing a wireless LAN service using a rental digital television according to another embodiment of the invention.

The method of FIG. 9 is applied to operation of a shopping mall.

A wireless-LAN-embedded digital television receives advertisement image information transmitted from an advertisement image server (905) and outputs an image produced by decoding the advertisement image information to a screen of the digital television (910). A portion of the screen of the digital television is used to advertise a variety of digital content and to present a method for accessing the management authentication server. Purchase information (for example, a purchase code) used to purchase digital content can be displayed on the screen (920).

Upon viewing the displayed purchase information, the user can access the management authentication server through the presented access method to purchase the corresponding content. Payment in this purchase process may be made using an already purchased right to use the Internet or using a separate payment process. Examples of digital content that can be sold include MP3, movie, e-book, newspaper, and cartoon.

If a fourth user inputs purchase information of digital content represented by a displayed image to a terminal of the fourth user to access the access point (930), then the management authentication server requests confirmation of the purchase information from the terminal of the fourth user (933).

When the fourth user has confirmed the purchase information, the management authentication server transmits digital content according to the purchase information to the terminal of the fourth user (950). The terminal of the fourth user then downloads the digital content transmitted from the management authentication server (960).

As needed, the system may be designed to integrate the advertisement image server and the management authentication server into a single server. In this case, the management authentication server may be used as the integrated server.

As needed, the system may include an external server in which digital content alone is stored. In this case, the system includes the advertisement image server, the management authentication server, and the external server.

Also in this service, an incentive such as discount of the lease fee may be provided to the lease service subscriber of the digital television according to purchase results.

Preferably, a program that causes a computer to perform the method for providing a wireless LAN service using a rental digital television according to the invention is provided through a computer-readable recording medium by recording the program on the recording medium.

The invention may be implemented in software. In this case, the components of the invention are code segments for performing required operations. Such program or code segments can be stored in a process-readable medium or can be transmitted using computer data signals combined with a carrier through a transmission medium or a communication network.

The computer-readable recording medium includes any type of storage device that can store data readable by a computer system. Examples of the computer-readable recording medium include a ROM, RAM, CD-ROM, DVD-ROM, DVD-RAM, magnetic tape, floppy disk, hard disk, and optical data storage. The computer-readable recording medium can also be distributed over a network of connected computer systems such that the computer-readable code is stored and executed in a distributed fashion.

As is apparent from the above description, the present invention provides a system and method for providing a wireless LAN service using a rental digital television which has a variety of advantages.

For example, digital television customers can easily install both a digital television and an environment for use of a wireless LAN in their home or place of business to receive a variety of services. Wireless LAN users can access and use environments in which it is easy to use the wireless LAN. Service providers can easily spread access points using the demand for digital televisions and thus can increase the number of wireless LAN service subscribers to provide a variety of services to them.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing a wireless LAN service using a rental digital television, the method comprising:
   recording information of a first user including a lease fee and registering the first user as a lease service subscriber in the management authentication server when the first user has made a digital television lease request;
   accessing a management authentication server using a service server included in a wireless-LAN-embedded digital television leased to the first user when the wireless-LAN-embedded digital television is turned on and determining whether or not the first user is a lease service subscriber;
   activating a TV tuner and an access point of the wireless-LAN-embedded digital television if the first user is a lease service subscriber;
   receiving through a packet receiver, at the wireless-LAN-embedded digital television, advertisement image information transmitted from an advertisement image server;
   outputting an image produced by decoding the advertisement image information to a screen;
   accessing the management authentication server using the service server when a terminal of a second user has accessed the access point and determining whether or not the second user is a wireless LAN service subscriber;
   providing a wireless LAN service to the terminal of the second user if the second user is a wireless LAN service subscriber regardless of whether the second user is a lease service subscriber or not; and
   adjusting the lease fee according to the number of times and how long terminals access the access point.

2. The method according to claim 1, further comprising:
   accessing the management authentication server using the service server when a phone of a third user has accessed the access point and determining whether or not the third user is an Internet phone service subscriber; and
   providing an Internet phone service to the phone of the third user if the third user is an Internet phone service subscriber.

3. The method according to claim 1, further comprising:
   receiving, at the wireless-LAN-embedded digital television, advertisement image information transmitted from an advertisement image server and outputting an image produced by decoding a stored advertisement image information to a screen;
   requesting, at the management authentication server, that a terminal of a fourth user confirm purchase information of digital content represented by the image when the purchase information has been input to the terminal of the fourth user to access the access point; and
   transmitting digital content according to the purchase information from the management authentication server to the terminal of the fourth user when the fourth user has confirmed the purchase information.

4. A system for providing a wireless LAN service using a rental digital television, the system comprising:

a management authentication server in which lease service subscriber information and wireless LAN service subscriber information is stored;

an advertisement image server in which advertisement image information is stored;

a terminal of a second user including a modem for accessing an access point; and a wireless-LAN-embedded digital television leased to a first user, wherein, when the wireless-LAN-embedded digital television is powered on, a TV tuner and an access point included in the wireless-LAN-embedded digital television is activated if the first user is a lease service subscriber and, when the wireless-LAN-embedded digital television is connected to the terminal of the second user, the wireless-LAN-embedded digital television provides a wireless LAN service to the terminal of the second user if the second user is a wireless LAN service subscriber regardless of whether the second user is a lease service subscriber or not, wherein the management authentication server records information of the first user including a lease fee and registers the first user as a lease service subscriber when the first user has made a digital television lease request and adjusts the lease fee according to the number of times and how long terminals access the access point, wherein the wireless-LAN-embedded digital television includes:

the TV tuner for outputting a received broadcast signal to a display panel;

the access point connected to a wired network, the access point being accessed by the terminal;

a service server, wherein, when the wireless-LAN-embedded digital television is turned on, the service server accesses the management authentication server to determine whether or not the first user is a lease service subscriber and, when the terminal has accessed the access point, the service server accesses the management authentication server to determine whether or not the second user is a wireless LAN service subscriber;

a packet receiver for accessing the advertisement image server and receiving the advertisement image information;

an image storage for storing the received advertisement image information; and an image transmitter for outputting an image produced by decoding the stored advertisement image information to a screen.

5. The system according to claim 4, further comprising:

a phone of a third user including Voice over Internet Protocol (VoIP) software, wherein, when the phone has accessed the access point, the service server accesses the management authentication server to determine whether or not the third user is an Internet phone service subscriber, and the access point provides an Internet phone service to the phone if the third user is an Internet phone service subscriber.

6. The system according to claim 4, further comprising:

a terminal of a fourth user that accesses the access point upon receiving purchase information that has been input to purchase digital content represented by the image, wherein, when the terminal of the fourth user has accessed the access point, the management authentication server requests the terminal of the fourth user to confirm the purchase information and, when the fourth user has confirmed the purchase information, the management authentication server transmits digital content according to the purchase information to the terminal of the fourth user.

* * * * *